(12) United States Patent
Xu et al.

(10) Patent No.: US 12,554,357 B2
(45) Date of Patent: Feb. 17, 2026

(54) TOUCH DISPLAY PANEL AND DISPLAY DEVICE

(71) Applicant: Wuhan China Star Optoelectronics Semiconductor Display Technology Co., Ltd., Wuhan (CN)

(72) Inventors: Zuzhao Xu, Wuhan (CN); Xiaoxia Zhang, Wuhan (CN); Xiaoguang Zhu, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 11 days.

(21) Appl. No.: 17/610,706

(22) PCT Filed: Oct. 12, 2021

(86) PCT No.: PCT/CN2021/123342
§ 371 (c)(1),
(2) Date: Nov. 12, 2021

(87) PCT Pub. No.: WO2023/044986
PCT Pub. Date: Mar. 30, 2023

(65) Prior Publication Data
US 2024/0241594 A1     Jul. 18, 2024

(30) Foreign Application Priority Data

Sep. 27, 2021  (CN) .......................... 202111135714.X

(51) Int. Cl.
G06F 3/041     (2006.01)
(52) U.S. Cl.
CPC .................. G06F 3/04164 (2019.05); *G06F 2203/04107* (2013.01)

(58) Field of Classification Search
CPC combination set(s) only.
See application file for complete search history.

(56) References Cited

U.S. PATENT DOCUMENTS

2014/0285411 A1* 9/2014 Tamura ................ G09G 3/3208
                                                        345/82
2016/0105952 A1* 4/2016 Park .................... G02F 1/13338
                                                        349/12

(Continued)

FOREIGN PATENT DOCUMENTS

CN         106648204 A     5/2017
CN         107085487 A     8/2017

(Continued)

OTHER PUBLICATIONS

International Search Report in International application No. PCT/CN2021/123342, mailed on Jun. 23, 2022.

(Continued)

*Primary Examiner* — William Boddie
*Assistant Examiner* — Alecia D English
(74) *Attorney, Agent, or Firm* — Nathan & Associates Patent Agents Ltd.; Menachem Nathan

(57) ABSTRACT

A touch display panel and a display device are provided. The touch display panel includes a plurality of data line groups, a plurality of touch wiring groups, a plurality of shielding wiring groups, and a plurality of thin film transistors. Through correspondingly connecting one thin film transistor to at least one shielding wiring, the thin film transistor can be turned on and a corresponding electrical signal is input during the lighting test, improving or eliminating the bright lines caused by the data lines suffering the interference during the lighting test.

20 Claims, 4 Drawing Sheets

(56) References Cited

U.S. PATENT DOCUMENTS

| | | | |
|---|---|---|---|
| 2016/0364068 A1* | 12/2016 | Cheng | G06F 3/0412 |
| 2018/0074629 A1 | 3/2018 | Lee | |
| 2020/0126479 A1* | 4/2020 | Yamasaki | G09G 3/3225 |
| 2021/0173545 A1* | 6/2021 | Kurasawa | G06F 3/0412 |
| 2021/0333910 A1* | 10/2021 | Cheng | G06F 3/0446 |
| 2022/0100342 A1* | 3/2022 | Wang | G06F 3/0412 |
| 2022/0216290 A1* | 7/2022 | Zheng | H10K 59/131 |

FOREIGN PATENT DOCUMENTS

| | | |
|---|---|---|
| CN | 111781540 A | 10/2020 |
| CN | 112419949 A | 2/2021 |
| CN | 212569366 U | 2/2021 |
| CN | 113076028 A | 7/2021 |

OTHER PUBLICATIONS

Written Opinion of the International Search Authority in International application No. PCT/CN2021/123342, mailed on Jun. 23, 2022.

Chinese Office Action issued in corresponding Chinese Patent Application No. 202111135714.X dated Apr. 30, 2023, pp. 1-5.

* cited by examiner

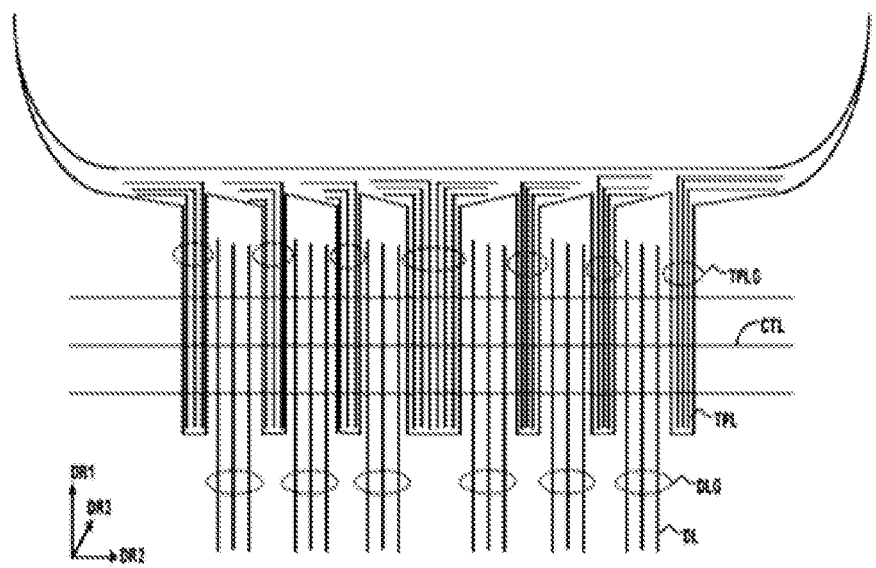
FIG. 1-Prior Art
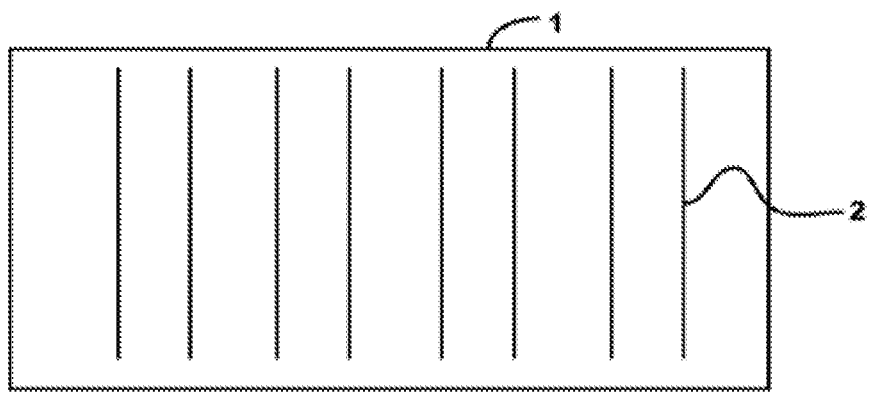
FIG. 2-Prior Art

TOUCH DISPLAY PANEL AND DISPLAY DEVICE

CROSS REFERENCE OF RELATED APPLICATION

This application is a US national phase application based upon an International Application No. PCT/CN2021/123342, filed on Oct. 12, 2021, which claims the priority of Chinese Patent Application No. 202111135714.X, entitled "TOUCH DISPLAY PANEL AND DISPLAY DEVICE", filed on Sep. 27, 2021, the disclosures of which are incorporated herein by reference in its entirety.

FIELD OF THE DISCLOSURE

The present disclosure relates to a field of display technology, and more particularly to a touch display panel and a display device.

BACKGROUND

A touch display panel 1 as shown in FIG. 1 and FIG. 2 comprises a plurality of data line groups DLG and a plurality of touch wiring groups TPLG which are arranged alternately in sequence and further comprises a plurality of lighting test signal lines CTL. Each of the data line groups DLG comprises at least one data line DL, and each of the touch wire groups TPLG comprises at least one touch wirings TPL. In the direction of the thickness of the touch display panel 1, the projection of the plurality of lighting test signal lines CTL at least partially overlap the projection of the plurality of touch wiring groups TPLG.

During the lighting test of the touch display panel 1, since there is no bound driver chip, the touch wirings TPL and the data lines DL do not receive corresponding signals output by a driver chip, and the data lines DL and the lighting test signal lines CTL needs to receive corresponding signals provided by a lighting test circuit for lighting test. At this time, since the touch wirings TPL do not receive signals and are in a floating state, the lighting test signal lines CTL cross or couple with the touch wirings TPL in the direction of the thickness of the touch display panel 1, so the touch wirings TPL have corresponding potentials due to the coupling. Coupling is also formed between the touch wirings TPL and the data lines DL, thereby interfering with the data signals transmitted on the data lines DL, which results that bright lines 2 appear at fixed positions where red pictures and blue pictures are shown on the touch display panel 1 as shown in FIG. 2. This will cause the lighting test (CT) to fail in normal judgement. If the case where the bright lines 2 appears is ignored, the actual broken wires may be missed, and these broken wires will affect the display quality.

The above introduction of the background technology is only for clear and complete understanding of the technical solutions of the present disclosure. Therefore, it cannot be considered that the above involved technical solutions are known to those skilled in the art just because they appear in the background of the present disclosure.

SUMMARY

Thus, the present disclosure provides a touch display panel and a display device for improving the technical problem of bright lines caused by floating touch wiring TPL interfering with data lines during lighting test.

In a first aspect, the present disclosure provides a touch display panel comprising a plurality of data line groups, a plurality of touch wiring groups, a plurality of shielding wiring groups, and a plurality of thin film transistors. Each data line group includes at least one data line extending along a first direction. The plurality of touch wiring groups and the plurality of data line groups are alternately arranged along a second direction, each touch wiring group comprising at least one touch wiring extending along the first direction. At least one shielding wiring group is located between the corresponding adjacent data line group and touch wiring group in the second direction, each shielding wiring group comprising at least one shielding wiring. One terminal of at least one thin film transistors being electrically connected to the corresponding shielding wiring, the one terminal is one of a source and a drain.

According to one embodiment of the present disclosure, the shielding wiring group comprises at least two shielding wirings which are arranged in sequence along the second direction. One terminal of each thin film transistor is electrically connected to one corresponding shielding wiring.

According to one embodiment of the present disclosure, the shielding wiring group comprises three shielding wirings. The three shielding wirings are arranged in sequence along the second direction. One terminal of each thin film transistor is electrically connected to the three shielding wirings.

According to one embodiment of the present disclosure, the touch display further comprises a control signal line electrically connected to the plurality of thin film transistors, and an input signal line electrically connected to other terminals of the plurality of thin film transistors.

According to one embodiment of the present disclosure, the first input signal line and the second input signal line transmit constant voltage signal or square wave signal.

According to one embodiment of the present disclosure, the data line transmits data signal, and the square wave signal having a duty cycle the same as a duty cycle of the data signal.

According to one embodiment of the present disclosure, a width of the shielding wiring is greater than or equal to a width of the data line, and the width of the shielding wiring is greater than or equal to a width of the touch wiring.

According to one embodiment of the present disclosure, the touch display panel further comprises a switch circuit and a lighting test control circuit electrically connected to the switch circuit and the plurality of thin film transistors. One terminal of the switch circuit is electrically connected to one data line. The lighting test control circuit is configured to turn on the plurality of thin film transistors in response to starting or performing of a lighting test of the touch display panel to transmit electrical signals to the corresponding shielding wiring and turn off the plurality of thin film transistors in response to ending of the lighting test of the touch display panel to avoid affecting an normal operation of the touch display panel.

According to one embodiment of the present disclosure, the touch display panel further comprises a driving integrated circuit. The driving integrated circuit includes a plurality of touch output terminals and a plurality of display output terminals. One touch output terminal is electrically connected to one touch wiring, one display output terminal being electrically connected with one data line.

In a second aspect, the present disclosure provides a display device comprising the touch display panel of any of the above embodiments. The first direction is interlaced with the second direction and the third direction is a thickness direction of the touch display panel.

In the display device of the embodiment, a shielding wiring group is provided between the adjacent data line group and touch wiring group, which can reduce or eliminate the sudden effect of the touch wiring group on the capacitive reactance and/or impedance of the data line groups, thereby reducing occurrence of bright lines caused by the floating touch wirings interfering with the data signals during the lighting test. Moreover, through correspondingly connecting one thin film transistor to at least one shielding wiring, the thin film transistor can be turned on and a corresponding electrical signal is input during the lighting test. Thus, the coupling effect between the touch wirings and the data lines can be reduced or eliminated, and sudden change in the capacitive reactance and/or impedance of the adjacent data lines caused by the shielding wirings can be also reduced or eliminated, thereby reducing interference with the data signals and also improving or eliminating the bright lines caused by the data lines suffering the interference during the lighting test.

BRIEF DESCRIPTION OF THE DRAWINGS

FIG. 1 is a schematic diagram of a structure of a conventional touch display panel.

FIG. 2 is a schematic diagram of display effect of the touch display panel shown in FIG. 1 during a lighting test.

DETAILED DESCRIPTION

Figure 3:
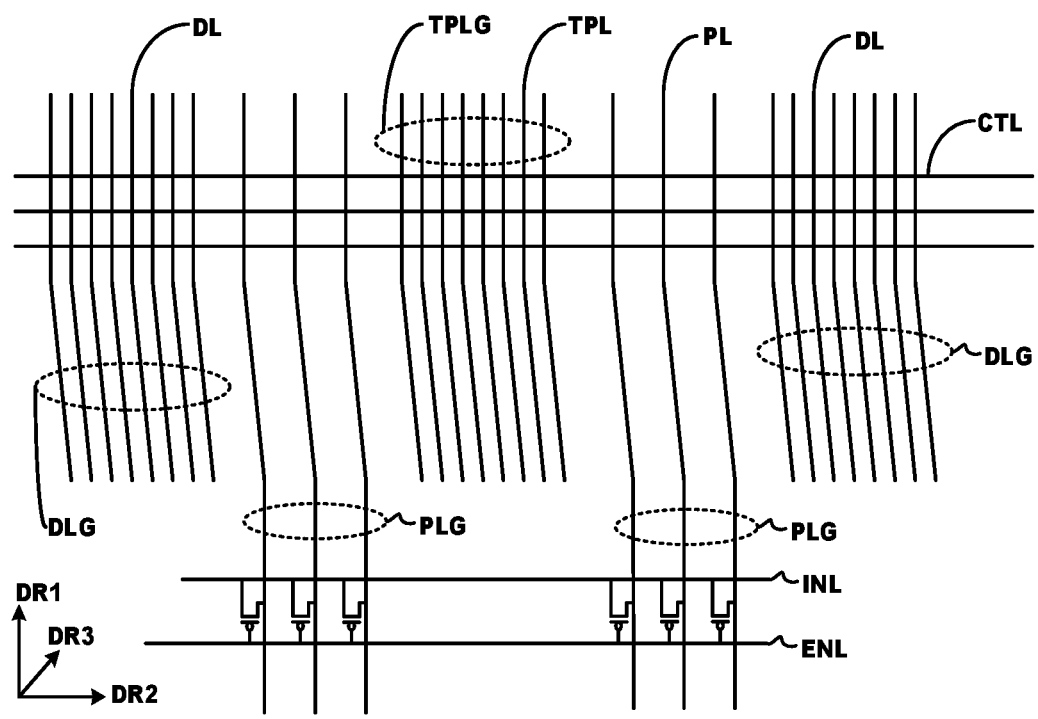
FIG. 3 is a schematic diagram of a structure of a touch display panel provided by an embodiment of the present disclosure.

Embodiments of the present disclosure are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present disclosure, and are not to be construed as limiting the scope of the present disclosure.

Figure 4:
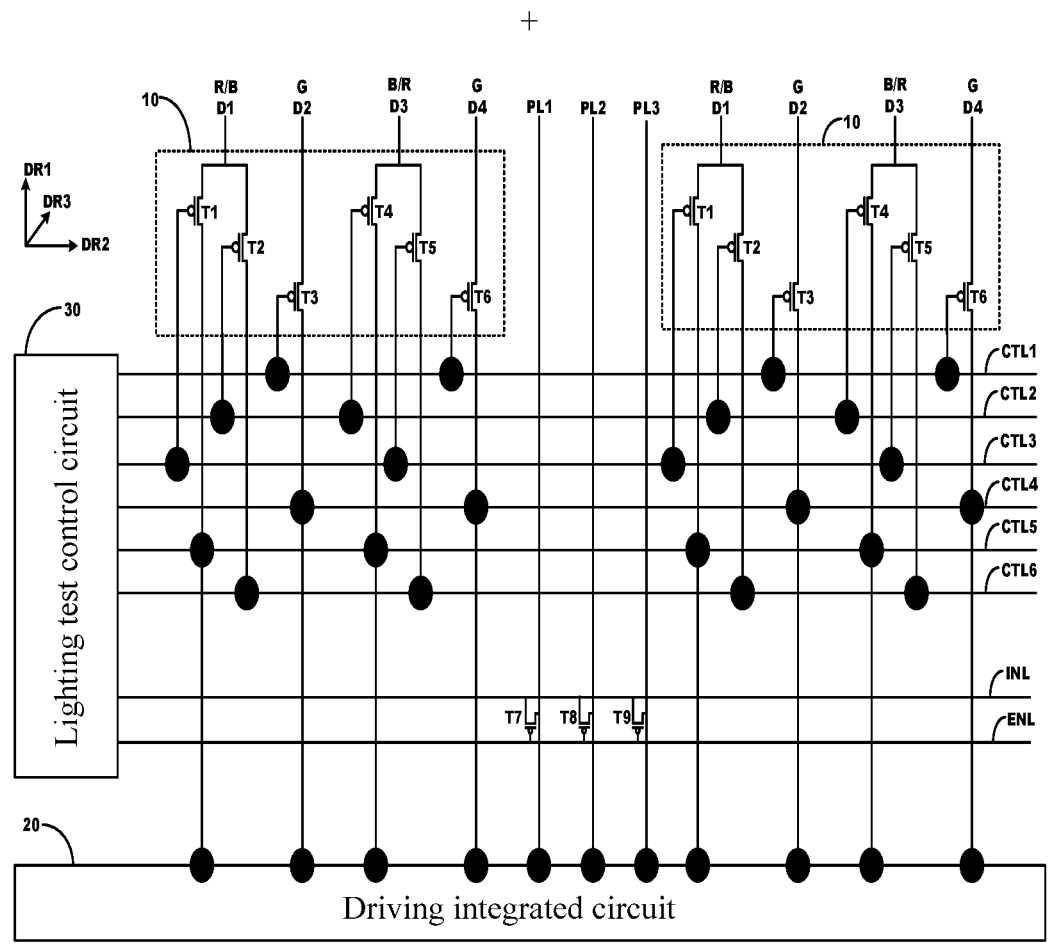
FIG. 4 is a schematic diagram of another structure of a touch display panel provided by an embodiment of the present disclosure.

As shown in FIG. 3 and FIG. 4, the embodiment provides a touch display panel, which comprises a plurality of data line groups DLG, a plurality of touch wiring groups TPLG, a plurality of shielding wiring groups PLG, and a plurality of thin film transistors. Each data line group DLG comprises at least one data line DL extending along a first direction DR1. The plurality of touch wiring groups TPLG and the plurality of data line groups DLG are alternately arranged along a second direction DR2. Each touch wiring group TPLG comprises at least one touch wiring TPL extending along the first direction DR1. At least one shielding wiring group PLG is located between the corresponding adjacent data line group DLG and touch wiring group TPLG in the second direction DR2. Each shielding wiring group PLG comprises at least one shielding wiring PL. One terminal of at least one thin film transistor is electrically connected to the corresponding shielding wiring PL. The one terminal is one of a source and a drain.

The plurality of thin film transistors can be N-channel thin film transistors. During a lighting test, the gates of the thin film transistors receive high-potential signals to input electrical signals to the corresponding shielding wirings PL, which can avoid that the capacitive reactance and/or impedance of the data lines DL adjacent to the shielding wirings PL in the second direction DR2 change suddenly, thereby reducing interference with the data signals. During the normal use of the touch display panel, the normal function can be realized by removing the high-potential signals and/or electrical signals. The plurality of thin film transistors can be P-channel thin film transistors. During the lighting test, the gates of the thin film transistors receive low-potential signals to input electrical signals to the corresponding shielding wirings PL, which can avoid that the capacitive reactance and/or impedance of the data lines DL adjacent to the shielding wirings PL in the second direction DR2 change suddenly, thereby reducing interference with the data signals. During the period when the touch display panel is used normally, the normal function can be realized by removing the low-potential signals and/or electrical signals.

The plurality of thin film transistors may be low temperature polysilicon thin film transistors or oxide thin film transistors.

The touch display panel further comprises a plurality of lighting test signal lines CTL. The plurality of lighting test signal lines CTL extend along the second direction DR2, and, in a third direction DR3, the projection of the plurality of lighting test signal lines CTL at least partially overlap the projection of the plurality of touch wiring groups TPLG.

One shielding wiring group PLG comprises three shielding wirings PL which are arranged in sequence along the second direction DR2. One terminal of each thin film transistor is electrically connected to a corresponding shielding wiring PL (further refer to, for example, FIG. 5).

In the embodiment, the greater the number of shielding wirings PL included in the same shielding wiring group PLG is, the more significant the isolation between the data lines DL and the touch wirings TPL, which can reduce or avoid sudden change in the capacitive reactance and/or impedance of the data lines DL and further reduce or avoid interference with the data signals, thereby avoiding occurrence of bright lines during the lighting test.

One shielding wiring group PLG comprises at least two shielding wirings PL which are arranged in sequence along the second direction DR2. One terminal of each thin film transistor is electrically connected to the shielding wirings PL in the same shielding wiring group PLG (further refer to, for example, FIG. 5).

Figure 5:
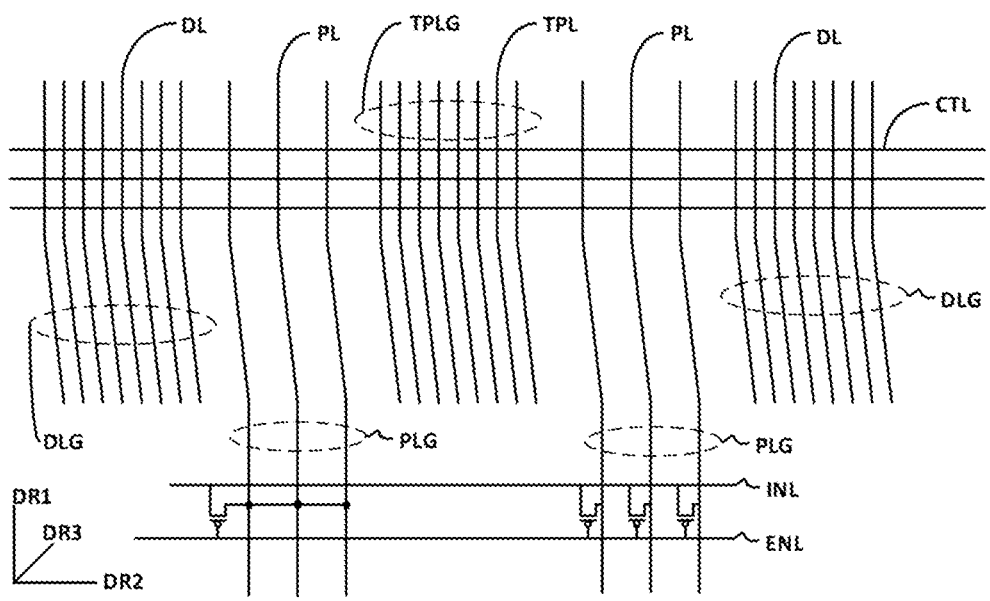
FIG. 5 is a schematic diagram of another structure of a touch display panel provided by an embodiment of the present disclosure.

In the embodiment, since several shielding wirings PL can share the same thin film transistor, the number of used thin film transistors can be decreased, which lowers complexity of the manufacturing process and also reduces the occupied space of the thin film transistors (further refer to, for example, FIG. 5).

One shielding wiring group PLG comprises three shielding wirings PL. The three shielding wirings PL are arranged in sequence along the second direction DR2. On terminal of each thin film transistor is electrically connected to three shielding wirings PL (further refer to, for example, FIG. 5).

Since the same thin film transistor can control whether three shielding wirings PL lead corresponding electrical signals in at the same time, the number of used thin film transistors is decreased, complexity of the manufacturing process is lowered, and the occupied space of the thin film transistors is reduced. At the same time, sudden change in the capacitive reactance and/or impedance of the data lines DL can be reduced or avoided, and interference with the data signals can be reduced or avoided, thereby avoiding occurrence of bright lines caused by the coupling of the floating touch wirings TPL and/or the shielding wirings PL during the lighting test.

The touch display panel further comprises a control signal line ENL and an input signal line INL. The control signal line ENL is electrically connected to the gates of the plurality of thin film transistors. The input signal line INL is electrically connected to other terminals of the plurality of thin film transistors.

Each of the other terminals is the other of the source and the drain.

The input signal line INL is used to transmit a constant voltage signal or a square wave signal. It is understandable that the constant voltage signal or the square wave signal induces less coupling effect on the data signals and also has less effect on the sudden change in the capacitive reactance and/or impedance of the data lines DL adjacent to the touch wirings TPL or the shielding wirings PL. The constant voltage signal may be a constant voltage high-potential signal.

The data lines DL are used to transmit data signals. The duty cycle of the square wave signal is the same as or similar to the duty cycle of the data signals. The square wave signal with the same or similar duty cycle of the data signals can induce less coupling effect on the data signals and has less effect on the sudden change in the capacitive reactance and/or impedance of the data lines DL adjacent to the touch wirings TPL or the shielding wirings PL.

The width of the shielding wirings PL is greater than or equal to the width of the data lines DL. The width of the shielding wirings PL is greater than or equal to the width of the touch wirings TPL.

As the width of the shielding wirings PL increases, the stability of the signal transmission of the shielding wirings PL can be improved, and the distance between the data lines DL and the shielding wirings PL in the second direction DR2 can be increased, which provides better effect on preventing sudden change in the capacitive reactance and/or impedance of the data lines DL.

As shown in FIG. 4, the touch display panel further comprises a driving integrated circuit 20. The driving integrated circuit 20 comprises a plurality of touch output terminals and a plurality of display output terminals. One touch output terminal is electrically connected to one touch wiring TPL. One display output terminal is electrically connected with one data line DL.

The driving integrated circuit 20 adopted by the touch display panel may be a driving chip which integrates a display function and a touch function and may be applied to the touch display panel at a lower cost and in a smaller occupied space. Before the lighting test, the driver integrated circuit 20 has not been bound in the touch display panel. After the lighting test, the driver integrated circuit 20 is bound in the touch display panel, and its corresponding output terminals are electrically connected to the corresponding touch wirings TPL, data lines DL, and shielding wirings PL respectively for providing corresponding touch signals, data signals, and electrical signals to the touch wirings TPL, data lines DL, and shielding wirings PL to meet the touch display requirements of the touch display panel.

The touch display panel also comprises a switch circuit 10 and a lighting test control circuit 30. One output terminal of the switch circuit 10 is electrically connected to one data line DL. The plurality of lighting test signal lines CTL are electrically connected to the control terminals of the switch circuit 10 and the input terminals of the switch circuit 10. The lighting test control circuit 30 is electrically connected to the plurality of lighting test signal lines CTL, the switch circuit 10, and thin film transistors, and is configured to turn on the thin film transistors in response to the starting or performing of the lighting test of the touch display panel to transmit electrical signals to the corresponding shielding wirings PL and turn off the thin film transistors in response to the ending of the lighting test of the touch display panel to avoid affecting the normal operation of the touch display panel.

The lighting test control circuit 30 can turn on the thin film transistors in response to the starting or performing of the lighting test of the touch display panel to transmit electrical signals to the corresponding shielding wirings PL and turn off the thin film transistors in response to the ending of the lighting test of the touch display panel for to avoid affecting the normal operation of the touch display panel. The thin film transistors and the lighting test control circuit 30 can operate synchronously during the lighting test, which saves the operation steps used to individually control the thin film transistors. It is beneficial to save manual operation, and the efficiency of the lighting test is improved.

The plurality of lighting test signal lines CTL comprises a lighting test control signal line CTL1, a lighting test control signal line CTL2, a lighting test control signal line CTL3, a lighting test input signal line CTL4, a lighting test input signal line CTL5, and a lighting test input signal line CTL6. The lighting test control signal line CTL1, the lighting test control signal line CTL2, the lighting test control signal line CTL3, the lighting test input signal line CTL4, the lighting test input signal line CTL5, and the lighting test input signal line CTL6 are arranged in in sequence along the direction opposite to the first direction DR1. The respective output terminals of the lighting test control circuit 30 are electrically connected to the lighting test control signal line CTL1, the lighting test control signal line CTL2, the lighting test control signal line CTL3, the lighting test input signal line CTL4, the lighting test input signal line CTL5, and the lighting test input signal line CTL6, respectively, to provide the corresponding lighting test control signals and lighting test input signals for the lighting test of the touch display panel.

The touch display panel comprises a plurality of switch circuits 10. Each switch circuit 10 comprises a thin film transistor T1, a thin film transistor T2, a thin film transistor T3, a thin film transistor T4, a thin film transistor T5, and a thin film transistor T6. The lighting test control signal line CTL1 is electrically connected to the gate of the thin film transistor T3 and the gate of the thin film transistor T6, and the lighting test control signal line CTL2 is electrically connected to the gate of the thin film transistor T2 and the gate of the thin film transistor T4. The lighting test control signal line CTL3 is electrically connected to the gate of the thin film transistor T1 and the gate of the thin film transistor T5. The lighting test input signal line CTL4 is electrically connected to one of the source and the drain of the thin film transistor T3, one of the source and the drain of the thin film transistor T6, and two output terminals of the driving integrated circuit 20. The lighting test input signal line CTL5 is electrically connected to one of the source and the drain of the thin film transistor T1, one of the source and the drain of the thin film transistor T4, and other two output terminals of the driving integrated circuit 20. The lighting test input signal line CTL6 is electrically connected to one of the source and the drain of the thin film transistor T2 and one of the source and the drain of the thin film transistor T5.

The other of the source and the drain of the thin film transistor T1 is electrically connected to the other of the source and the drain of the thin film transistor T2 to output a first data signal D1. The first data signal D1 comprises a data signal output to a red sub-pixel R and a data signal output to a blue sub-pixel B. The other of the source and the drain of the thin film transistor T3 is used to output a second data signal D2. The second data signal D2 is a data signal output to the green sub-pixel G. The other of the source and the drain of the thin film transistor T4 is electrically connected to the other of the source and the drain of the thin film transistor T5 to output a third data signal D3. The third data signal D3 comprises a data signal output to a blue sub-pixel B and a data signal output to a red sub-pixel R. The other of the source and the drain of the thin film transistor T6 is used to output a fourth data signal D4. The fourth data signal D4 is a data signal output to the green sub-pixel G.

The thin film transistors T1, T3, T4, and T6 operate not only during the lighting test, but also during the normal use of the touch display panel, thereby realizing the multi-functions of the thin film transistors T1, T3, T4, and T6, so that the occupied space of the touch display panel is saved, the manufacturing process of the touch display panel is also simplified. The thin film transistor T2 and the thin film transistor T5 operate only work during the lighting test of the touch display panel.

The first shielding wiring PL1 is electrically connected to one of the source and the drain of the thin film transistor T7 and one output terminal of the driving integrated circuit 20. The second shielding wiring PL2 is electrically connected to one of the source and the drain of the thin film transistor T8 and another output terminal of the driving integrated circuit 20. The third shielding wiring PL3 is electrically connected to one of the source and the drain of the thin film transistor T9 and another output terminal of the driving integrated circuit 20. The control signal line ENL is electrically connected to the gate of the thin film transistor T7, the gate of the thin film transistor T8, and the gate of the thin film transistor T9. The input signal line INL is electrically connected to the other of the source and the drain of the thin film transistor T7, the other of the source and the drain of the thin film transistor T8, and the other of the source and the drain of the thin film transistor T9.

The embodiment provides a display device, which comprises the touch display panel in any one of the above embodiments. The first direction DR1 is interlaced with the second direction DR2. The third direction DR3 is the thickness direction of the touch display panel.

In the display device of the embodiment, a shielding wiring group PLG is provided between the adjacent data line group DLG and touch wiring group TPLG, which can reduce or eliminate the sudden effect of the touch wiring group TPLG on the capacitive reactance and/or impedance of the data line groups DLG, thereby reducing occurrence of bright lines caused by the floating touch wirings TPL interfering with the data signals during the lighting test. Moreover, through correspondingly connecting one thin film transistor to at least one shielding wiring PL, the thin film transistor can be turned on and a corresponding electrical signal is input during the lighting test. Thus, the coupling effect between the touch wirings TPL and the data lines DL can be reduced or eliminated, and sudden change in the capacitive reactance and/or impedance of the adjacent data lines DL caused by the shielding wirings PL can be also reduced or eliminated, thereby reducing interference with the data signals and also improving or eliminating the bright lines caused by the data lines suffering the interference during the lighting test.

For a person of ordinary skill in the art, equivalent substitutions or changes can be made according to the technical solution of the present application and its inventive concept, and all these changes or substitutions shall fall within the protection scope of the appended claims of the present application.

What is claimed is:

1. A touch display panel comprising:
   a plurality of data line groups, each data line group comprising at least one data line extending along a first direction;
   a plurality of touch wiring groups, the plurality of touch wiring groups and the plurality of data line groups being alternately arranged along a second direction, each touch wiring group comprising at least one touch wiring extending along the first direction;
   a plurality of shielding wiring groups, at least one shielding wiring group being located between the corresponding adjacent data line group and touch wiring group in the second direction, each shielding wiring group comprising at least one shielding wiring; and
   a plurality of thin film transistors, one terminal of at least one thin film transistors being electrically connected to corresponding shielding wirings, the one terminal is one of a source and a drain;
   wherein the shielding wirings of at least one of the plurality of shielding wiring groups share the same thin film transistor.

2. The touch display panel of claim 1, wherein the shielding wiring group comprises at least two shielding wirings which are arranged in sequence along the second direction, one terminal of at least one thin film transistor is electrically connected to the at least two shielding wirings.

3. The touch display panel of claim 1, wherein the shielding wiring group comprises three shielding wirings, the three shielding wirings are arranged in sequence along the second direction, one terminal of at least one thin film transistor is electrically connected to the three shielding wirings.

4. The touch display panel of claim 1, further comprising:
   a control signal line electrically connected to the plurality of thin film transistors; and
   an input signal line electrically connected to other terminals of the plurality of thin film transistors.

5. The touch display panel of claim 4, wherein the input signal line transmits a constant voltage signal or a square wave signal.

6. The touch display panel of claim 1, wherein the data line transmits data signal, and the square wave signal having a duty cycle the same as a duty cycle of the data signal.

7. The touch display panel of claim 1, wherein a width of the shielding wiring is greater than or equal to a width of the data line, the width of the shielding wiring is greater than or equal to a width of the touch wiring.

8. The touch display panel of claim 1, wherein the touch display panel further comprises:
   a switch circuit, one terminal of the switch circuit being electrically connected to one data line; and
   a lighting test control circuit electrically connected to the switch circuit and the plurality of thin film transistors, configured to turn on the plurality of thin film transistors in response to starting or performing of a lighting test of the touch display panel to transmit electrical signals to the corresponding shielding wirings and turn off the plurality of thin film transistors in response to ending of the lighting test of the touch display panel to avoid affecting an normal operation of the touch display panel.

9. The touch display panel of claim 1, further comprising:
a driving integrated circuit, the driving integrated circuit comprising a plurality of touch output terminals and a plurality of display output terminals, one touch output terminal being electrically connected to one touch wiring, one display output terminal being electrically connected with one data line.

10. A display device comprising a touch display panel, the touch display panel comprising:
a plurality of data line groups, each data line group comprising at least one data line extending along a first direction;
a plurality of touch wiring groups, the plurality of touch wiring groups and the plurality of data line groups being alternately arranged along a second direction, each touch wiring group comprising at least one touch wiring extending along the first direction;
a plurality of shielding wiring groups, at least one shielding wiring group being located between the corresponding adjacent data line group and touch wiring group in the second direction, each shielding wiring group comprising at least one shielding wiring; and
a plurality of thin film transistors, one terminal of at least one thin film transistors being electrically connected to corresponding shielding wirings, the one terminal is one of a source and a drain, wherein the first direction is interlaced with the second direction and the third direction is a thickness direction of the touch display panel;
wherein the shielding wirings of at least one of the plurality of shielding wiring groups share the same thin film transistor.

11. The display device of claim 10, wherein the shielding wiring group comprises at least two shielding wirings which are arranged in sequence along the second direction, one terminal of at least one thin film transistor is electrically connected to the at least two shielding wirings.

12. The display device of claim 10, wherein the shielding wiring group comprises three shielding wirings, the three shielding wirings are arranged in sequence along the second direction, one terminal of at least one thin film transistor is electrically connected to the three shielding wirings.

13. The display device of claim 10, wherein the touch display penal further comprises:

a control signal line electrically connected to the plurality of thin film transistors; and
an input signal line electrically connected to other terminals of the plurality of thin film transistors.

14. The display device of claim 13, wherein the input signal line transmits a constant voltage signal or a square wave signal.

15. The display device of claim 10, wherein the data line transmits data signal, and the square wave signal having a duty cycle the same as a duty cycle of the data signal.

16. The display device of claim 10, wherein a width of the shielding wiring is greater than or equal to a width of the data line, the width of the shielding wiring is greater than or equal to a width of the touch wiring.

17. The display device of claim 10, wherein the touch display panel further comprises:
a switch circuit, one terminal of the switch circuit being electrically connected to one data line; and
a lighting test control circuit electrically connected to the switch circuit and the plurality of thin film transistors, configured to turn on the plurality of thin film transistors in response to starting or performing of a lighting test of the touch display panel to transmit electrical signals to the corresponding shielding wirings and turn off the plurality of thin film transistors in response to ending of the lighting test of the touch display panel to avoid affecting an normal operation of the touch display panel.

18. The display device of claim 10, wherein the touch display panel further comprises:
a driving integrated circuit, the driving integrated circuit comprising a plurality of touch output terminals and a plurality of display output terminals, one touch output terminal being electrically connected to one touch wiring, one display output terminal being electrically connected with one data line.

19. The display device of claim 10, wherein the plurality of thin film transistors are low temperature polysilicon thin film transistors.

20. The display device of claim 10, further comprising:
a plurality of lighting test signal line extending along the second direction, wherein a projection of the plurality of lighting test signal lines at least partially overlap a projection of the plurality of touch wiring groups in the third direction.

* * * * *